United States Patent Office 2,970,975
Patented Feb. 7, 1961

2,970,975

ACTIVATOR SYSTEM FOR SYNTHETIC RUBBER POLYMERIZATION

William N. Maclay, Monroeville, Pa., assignor to The B. F. Goodrich Company, New York, N.Y., a corporation of New York No Drawing. Filed Sept. 22, 1958, Ser. No. 762,214

5 Claims. (Cl. 260—27)

This invention relates to improvements in low temperature, sulfoxylate and iron activated, organic peroxide catalyzed synthetic rubber emulsion polymerizations. More particularly it relates to improvements whereby light colored rubber products can be produced more efficiently than in the past by control of the polymerization to obtain reduction and elimination of induction periods and more nearly linear polymerization rates once polymerization has started.

U.S. Patent 2,716,107 teaches that in low temperature, organic peroxide catalyzed, iron activated synthetic rubber emulsion polymerizations the overall reaction rate may be increased by employing a catalyst activator system comprising an iron salt, an alkali salt of ethylenediamine tetraacetic acid (i.e. a complexed iron system) and an aldehyde or ketone sulfoxylate. The emulsion systems contemplated by the patent include water-soluble soaps of soap-forming monocarboxylic acids, such as the alkali salts of aliphatic acids having 8 to 24 carbon atoms (the so-called fatty acid soaps), rosin acids, and naphthenic acids. Nothing is taught by the patent about using any mixtures of these emulsifiers. Hercules Powder Company now supplies to the synthetic rubber industry 50/50 mixtures of fatty acid soaps and disproportionated rosin acid soaps under the designations Dresinate 521 and Dresinate 555. The only known difference between these two materials is that Dresinate 555 is lighter in color. Such a mixed soap is highly desirable because fatty acid soaps contribute to faster polymerization and curing rates, while rosin acid soaps give rubbers with better building tack. Manufacturers often made such soap mixtures in their own plants to obtain these advantages; therefore having the mixing done by the soap manufacturer is highly beneficial for it effects savings in time, labor, storage and handling expense.

The use of mixed rosin acid/fatty acid emulsifiers in polymerization systems such as those described in Patent 2,716,107 along with the maintenance of very low iron levels (2–80 parts per million of monomers) in order to minimize color formation in the resultant rubber has led to some unexpected problems. In an organic peroxide catalyzed synthetic rubber aqueous polymerization activated by an iron salt and an alkali salt of ethylenediamine tetraacetic acid plus a sulfoxylate such as the patentee's preferred sodium formaldehyde sulfoxylate, if a mixture of fatty acid soap and rosin acid soap is used as the emulsifier, the system undergoes a lengthy polymerization induction period of up to 2 or 3 hours or more before polymerization starts. When either a disproportionated rosin acid soap or a fatty acid soap is used alone as the emulsifier, the induction periods are usually shorter, but they are still troublesome to plant operation. This problem is further aggravated by low initial polymerization rates for periods up to several hours once polymerization does start. I define induction period as the time elapsed from the completion of charging (0 hours) until the time indicated on a plot of percent conversion versus time when an extension of the linear portion of the conversion curve intercepts the time axis. I thus include in the induction period some time when polymerization may be taking place, but only at a very low rate per hour (usually less than 5% per hour). U.S. 2,716,107 teaches that while sodium formaldehyde sulfoxylate is the preferred salt in a sulfoxylate activated receipe, sodium benzaldehyde sulfoxylate gives even faster overall polymerization rates. Using sodium benzaldehyde sulfoxylate in place of sodium formaldehyde sulfoxylate in the mixed soap recipe with a low amount of iron (to avoid color formation) it is found that polymerization starts off rapidly, but unfortunately dies out at low levels of about 10–25 percent conversion.

Lengthy induction periods, low initial polymerization rates, and low total conversion die-off are very undesirable factors in the modern synthetic rubber plant even if a light colored rubber is a result.

As presently produced, the butadiene-styrene general purpose rubbers, known as SBR rubbers, are manufactured by a continuous polymerization system. Lines of polymerizers piped together in series form the heart of this operation. Monomers, soaps, emulsifiers, activators, retarders, viscosity reducers, catalysts, modifiers and the polymerization medium (water), are continuously and automatically metered, weighed and charged into the first polymerizer and the mass of materials moves forward under controlled conditions of temperature and agitation through the entire line of polymerizers which may number 12 to 15 units, usually 13. After leaving the final polymerizer, the polymer emulsion is separated from residual monomers which are recovered and recycled, and the polymer is stored in aqueous form as latex or coagulated to give solid rubber.

The ideal of such a continuous system is to have rigid, standard and uniform operating conditions day in and day out to produce an ever uniform product. It is desirable to have polymerization start in the first polymerizer as soon as the ingredients are mixed and continue at an even rate per unit of time, i.e. a linear rate, through as many polymerizers as are needed to attain the desired percent conversion of monomer to polymer. This means that there should be no induction or waiting period before polymerization starts and that once started, polymerization should continue at a determined and uniform rate of conversion per hour or unit of time. Conversion should take place at say 6–8 percent per hour until the desired final conversion of 60 to 80 percent is reached. It should not run at a high percent in the early hours and a low percent in the final hours or vice versa—rates which can give the same average rate per hour as the uniform polymerization does, but which produce latexes and rubbers of varying quality and which place an unusual burden on heat exchange equipment.

It is an object of this invention to provide light colored synthetic rubber in latex and solid forms produced at uniform, linear rates of conversion. It is a further object to provide an improved activator system for low temperature, organic peroxide catalyzed, mixed soap emulsified, aqueous emulsion polymerization of synthetic rubber forming monomers. Yet another object is to provide a mixed sulfoxylate, low iron activator system for low temperature synthetic rubber aqueous emulsion polymerization of butadiene:styrene whereby induction periods are substantially zero and polymerization rates are substantially linear when mixed fatty acid/disproportionated rosin acid soaps are employed with low levels of iron activation.

These and other objects are attained as described hereinafter by using a low (i.e. less than 0.008 part per hundred of monomer) iron level, said iron being chemically bound or complexed in an ethylenediamine tetraacetic acid compound or its equivalent in iron-complexing powers, and an approximately 80/20 molar percent mixture of sodium formaldehyde sulfoxylate and sodium benzaldehyde sulfoxylate.

I have now discovered that by employing not just one, but two aldehyde sulfoxylates mixed in a rather narrow range of compositions it is possible to run a synthetic rubber aqueous emulsion polymerization with organic peroxide catalysis, low iron activation and 50/50 mixed fatty acid/disproportionated rosin acid emulsification at low temperatures with no induction periods before polymerization starts and a satisfactory linear rate of conversion of monomers to polymer throughout the entire cycle.

In accordance with my invention sodium benzaldehyde sulfoxylate (SBS, mol. wt. 194) is mixed with sodium formaldehyde sulfoxylate dihydrate (SFS.2H$_2$O, mol. wt. 154) on the basis of a 15 to 70 mol percent replacement with 15 to 25 mol percent being preferred and 20 mol percent replacement being most preferred. For example, instead of using 0.10 part SFS, I use a 0.08/0.025 part SFS/SBS mixture at the preferred 20 mol percent replacement level. At 15 mol percent replacement the ratio is 0.085/.019 part SFS/SBS and at 25 mol percent replacement the ratio is 0.075/.031 part SFS/SBS.

The aldehyde sulfoxylates may be prepared as described in U.S. 2,716,107 by the reaction of the selected aldehyde with sodium hydrosulfite. The amount of sulfoxylate mixture used will generally be from 0.0002 to 0.02 gram equivalent per 100 grams of polymerizable monomers or 0.02 to 2 parts per 100 parts of said monomers.

The catalyst may be one of many known organic peroxide catalysts, including paramenthane hydroperoxide, cumene hydroperoxide, cymene hydroperoxide, diisopropylbenzene hydroperoxide, etc. Catalyst is usually used in amounts from 0.02 to 2 parts per 100 parts of polymerizable monomers.

The iron salt is preferably a complexed iron salt such as Versene Iron Chelate also known as disodium ferrous ethylenediamine tetraacetate which contains 8% by weight complexed iron, or Sequestrene NaFe also known as monosodium ferric ethylenediamine tetraacetate which contains 13% by weight complexed iron. Alternatively, the iron may be charged as ferrous sulfate or ferric chloride or other available iron salt, but there must be a complexer or iron chelator (sequestering) compound charged also. Materials of the latter type include Versene (tetrasodium ethylenediamine tetraacetate), Versene Fe-3 (90% tetrasodium ethylenediamine tetraacetate/10% dihydroxyethylglycine) and Perma Kleer SP (believed to be equimolar mixed trisodium hydroxyethylethylenediamine triacetate and sodium gluconate). To obtain light colored rubber products, I must keep the level of iron very low, .0002 to .008 part of actual iron per 100 parts of polymerizable monomer, preferably .0025 to .0040 part of iron per 100 parts of polymerizable monomer.

For the emulsifying agent I prefer to use the 50/50 fatty acid/disproportionated rosin acid soaps known as Dresinate 521 and Dresinate 555 supplied by the Hercules Powder Company. Entirely fatty acid soaps, or entirely rosin acid soap may also be used, but the mixed soap is preferred. From 1 to 10 parts of these emulsifying agents are usually employed.

Known polymerization regulators such as aliphatic mercaptans having 6 to 18 carbon atoms and aromatic mercaptans may be used as modifiers to regulate polymer chain length. From 0.1 to 0.5 part per 100 parts of polymerizable monomer are usually charged.

The synthetic rubber-forming monomers that may be used with the improved activator system of my invention include conjugated butadiene hydrocarbons such as butadiene-1,3, isoprene, piperylene, 2,3-dimethyl butadiene-1,3 and chloro-2-butadiene-1,3 either alone, admixed or mixed with olefinic compounds characterized by a terminally unsaturated methylene group (CH$_2$=C<) and which are known to form rubber-like copolymers with butadiene hydrocarbons such as acrylonitrile, methyl acrylate, methylmethacrylate, styrene, vinyl naphthalene, parachlorostyrene, vinylidene chloride and vinyl pyridine.

The following examples are illustrative of the invention. Parts and percentages referred to are by weight, and all polymerizations are run at 5° C.

*Example I*

An aqueous emulsion of synthetic rubber-forming monomers was made according to the following recipe:

| Ingredient | Parts by Weight |
|---|---|
| Butadiene | 71 |
| Styrene | 29 |
| Water | 200 |
| Potassium soap of disproportionated rosin acid | 2.25 |
| Fatty acid soap | 2.25 |
| Tamol N [1] | 0.05 |
| Potassium chloride | 0.60 |
| Tertiary C$_{12}$ mercaptan | 0.20 |
| Paramenthane hydroperoxide | 0.15 |
| Sodium hydrosulfite | 0.02 |
| Sodium formaldehyde sulfoxylate | 0.10 |
| Versene Iron Chelate (8% complexed ferrous iron) | 0.01 |

[1] Tamol N is the sodium salt of the condensation product of formaldehyde and beta-naphthalene sulfonic acid.

The 200 parts of water include water added as such as well as water used to make up solutions of other added reagents. The following charging order was used: (1) water, (2) water solution of soap emulsifier, potassium chloride, sodium hydrosulfite, (3) most of the styrene containing the mercaptan, (4) butadiene, (5) after cooling to 5° C., the Versene Iron Chelate dissolved in water, (6) the SFS dissolved in water, and (7) the peroxide catalyst dissolved in withheld styrene.

The polymerization was carried out for 22½ hours at 5° C. after which the percent conversion of monomers was determined by evaporation of a weighed sample of the latex. Samples were also taken at intervals to determine percent conversion:

| Hours: | Percent conversion |
|---|---|
| 0 | 0 |
| 0.68 | 0.1 |
| 1.35 | 0.35 |
| 2.95 | 0.53 |
| 4.40 | 2.61 |
| 5.90 | 6.70 |
| 22.57 | 77.07 |

The induction period was 3 hours; the 22½ hour overall period to 77% conversion was excessively long. Upon coagulation the latex gave very white crumbs.

*Example II*

In this example the premixed emulsifier Dresinate 521 (50/50 disproportionated rosin acid/fatty acid) supplied by Hercules Powder Company was used:

| Ingredient | Parts by Weight |
|---|---|
| Butadiene | 71 |
| Styrene | 29 |
| Water | 200 |
| Dresinate 521 | 4.50 |
| Tamol N | 0.05 |
| Potassium chloride | 0.60 |
| Sodium hydrosulfite | 0.02 |
| Tertiary C$_{12}$ mercaptan | 0.20 |
| Paramenthane hydroperoxide | 0.15 |
| Versene Iron Chelate | 0.03 |
| Sodium formaldehyde sulfoxylate | 0.10 |

Samples were taken at intervals to check conversion rate and total conversion:

| Hours: | Percent conversion |
|---|---|
| 1.03 | 0.56 |
| 2.47 | 5.91 |
| 4.53 | 26.45 |

5.93 — 42.45
7.48 — 62.85

The induction period and low initial rate period totaled 2 hours. The coagulated rubber was very light in color.

Example III

Using the recipe of Example II, but varying the sodium formaldehyde sulfoxylate from 0.04 part of 0.20 part in increments of 0.04 part produced data for a series of conversion curves that showed from 1 to 2½ hours combined induction and low initial rate conversion periods.

Example IV

The following recipe was used to evaluate sodium benzaldehyde sulfoxylate (SBS) as a reductant in the low iron, organic peroxide catalyzed synthetic rubber system:

| Ingredient | Parts by Weight |
|---|---|
| Butadiene | 71 |
| Styrene | 29 |
| Water | 200 |
| Mixed 50/50 fatty acid/disproportionated rosin acid soap | 4.5 |
| Tamol N | 0.05 |
| Potassium chloride | 0.60 |
| Tertiary $C_{12}$ mercaptan | 0.20 |
| Paramenthane hydroperoxide | 0.25 |
| Versene Iron Chelate | 0.01 |
| Sodium hydrosulfite | 0.02 |
| Sodium benzaldehyde sulfoxylate | Variable 0.01–0.05 |

The procedure of Example I was followed, but in 5 hours all of the reactions were effectively dead, so the polymerizations were dropped.

| Run | | | | | | | |
|---|---|---|---|---|---|---|---|
| A | | B | | C | | D | |
| Parts SBS | | | | | | | |
| 0.01 | | 0.03 | | 0.04 | | 0.05 | |
| Hrs. | Percent Conv. | Hrs. | Percent Conv. | Hrs. | Percent Conv. | Hrs. | Percent Conv. |
| 0.98 | 1.05 | 1.07 | 6.12 | 1.10 | 8.88 | 1.13 | 9.01 |
| 1.90 | 2.29 | 1.98 | 8.81 | 2.02 | 10.68 | 2.07 | 10.62 |
| 3.27 | 3.90 | 3.37 | 10.20 | 3.40 | 12.30 | 3.45 | 13.31 |
| 5.00 | 4.13 | 5.08 | 11.41 | 5.12 | 13.82 | 5.15 | 15.36 |

SBS is very effective at initiating polymerization and maintaining a high initial rate of conversion, but its effect seems to disappear in a few hours.

Example V

The procedure of Example I was followed with the following recipe to evaluate low iron, variable sodium benzaldehyde sulfoxylate and the potassium soap of a commercial mixture of stearic, palmitic and oleic acids as the emulsifier. Polymerization had effectively ceased after 6 hours with all conversions still below 55 percent, but the induction and low initial rate period had been reduced to zero:

| Ingredient | Parts by Weight |
|---|---|
| Butadiene | 71 |
| Styrene | 29 |
| Water | 200 |
| Potassium fatty acid soap | 4.5 |
| Tamol N | 0.05 |
| Potassium chloride | 0.60 |
| Tertiary $C_{12}$ mercaptan | 0.20 |
| Paramenthane hydroperoxide | 0.15 |
| Versene Iron Chelate | 0.03 |
| Sodium hydrosulfite | 0.02 |
| Sodium benzaldehyde sulfoxylate | Variable |

| Run | | | | | | | |
|---|---|---|---|---|---|---|---|
| A | | B | | C | | D | |
| Parts SBS | | | | | | | |
| 0.04 | | 0.08 | | 0.12 | | 0.16 | |
| Hrs. | Percent Conv. | Hrs. | Percent Conv. | Hrs. | Percent Conv. | Hrs. | Percent Conv. |
| 1.03 | 20.56 | 1.08 | 21.98 | 1.12 | 23.19 | 1.15 | 19.20 |
| 1.97 | 29.26 | 2.00 | 34.56 | 2.03 | 34.43 | 2.08 | 23.00 |
| 3.50 | 38.26 | 3.53 | 44.48 | 3.57 | 43.09 | 3.62 | 29.30 |
| 5.07 | 43.46 | 5.10 | 48.98 | 5.13 | 46.29 | 5.17 | 31.70 |

Again the polymerizations were fast starting, high early rate of conversion, early die-off types.

Example VI

With the following recipe, and the polymerization procedure of the previous examples, several runs were made using mixtures high in sodium benzaldehyde sulfoxylate, and low in sodium formaldehyde sulfoxylate with low iron and mixed soap emulsification.

| Ingredient | Parts by Weight |
|---|---|
| Butadiene | 71 |
| Styrene | 29 |
| Water | 200 |
| Mixed rosin acid/fatty acid soap (50/50) | 4.5 |
| Tamol N | 0.1 |
| Potassium chloride | 0.6 |
| Paramenthane hydroperoxide | 0.1 |
| Tertiary $C_{12}$ mercaptan | 0.2 |
| Versene Iron Chelate | 0.02 |
| Sodium formaldehyde sulfoxylate | variable |
| Sodium benzaldehyde sulfoxylate | variable |

When 100% of SFS was replaced, conversion died at 8% in 3 hours. When 90% of the SFS was replaced by SBS, conversion reached 15% and died at 5 hours. In a run where 80% of SFS was replaced with SBS, conversion reached 41% and died in 7 hours, but in each case polymerization started immediately at a good rate with no induction period when the catalyst activator solution was added.

Example VII

Using the following recipe and the procedure of the previous examples, runs were made varying the molar substitution of SBS for SFS to determine the optimum range of mixtures that will give zero induction period and a rapid, linear rate of conversion throughout the entire range of polymerization when using the mixed rosin acid/fatty acid emulsifier.

| Ingredient | Parts by Weight |
|---|---|
| Butadiene | 71 |
| Styrene | 29 |
| Water | 200 |
| Mixed 50/50 disproportionated rosin acid/fatty acid soap | 4.5 |
| Tamol N | 0.1 |
| Potassium chloride | 0.6 |
| Tertiary $C_{12}$ mercaptan | 0.2 |
| Paramenthane hydroperoxide | 0.10 |
| Versene Iron Chelate | 0.02 |
| Sodium benzaldehyde sulfoxylate | variable |
| Sodium formaldehyde sulfoxylate | variable |

| Run | | | | | | | | | |
|---|---|---|---|---|---|---|---|---|---|
| A | | B | | C | | D | | E | |
| Molal percent SBS/SFS | | | | | | | | | |
| 0/100 | | 20/80 | | 40/60 | | 50/50 | | 70/30 | |
| Hrs. | Conv. | Hrs. | Conv. | Hrs. | Conv. | Hrs. | Conv. | Hrs. | Conv. |
| 1.00 | 2.88 | 1.05 | 13.16 | 1.12 | 18.03 | 1.15 | 19.52 | 1.05 | 18.10 |
| 1.80 | 8.38 | 1.83 | 21.56 | 1.90 | 27.93 | 1.93 | 29.12 | 1.75 | 26.00 |
| 2.95 | 16.98 | 2.98 | 33.26 | 3.07 | 39.33 | 3.12 | 41.72 | 3.18 | 39.90 |
| 4.50 | 31.48 | 4.53 | 50.26 | 4.58 | 54.83 | 4.65 | 55.33 | 4.68 | 52.30 |
| 6.00 | 46.88 | 6.03 | 64.46 | 6.10 | 67.23 | 6.13 | 67.42 | 6.22 | 62.40 |

A plot of these data shows that the all SFS recipe has an induction period of ½ hour, while all recipes containing SBS have zero induction period. At 80 molal percent SBS the rate curve quickly flattens out and polymerization ceases at about 42% in 7 hours. A 20 molal percent replacement of SFS with SBS is clearly the optimum. Run B has no induction period and conversion proceeds at a nearly linear rate throughout the entire run. Any one of 40, 50, and 70 molal percent replacements of SFS with SBS gives fast starting polymerization which slows down slightly in the 30–40 percent conversion range, but does attain high conversions in the 70–80 percent range in satisfactory time. The latter do not, however, exhibit the high degree of uniformity or evenness of conversion that is shown by the 20 molal percent replacement.

*Example VIII*

A series of runs was made in the manner of Example VII, employing butadiene as the sole monomer, and the following recipe:

| Ingredient | Parts by Weight |
|---|---|
| Butadiene | 100 |
| Water | 200 |
| Mixed 50/50 disproportionated rosin acid/fatty acid soap | 4.50 |
| Tamol N | 0.10 |
| Potassium chloride | 0.60 |
| Tertiary C$_{12}$ mercaptan | 0.20 |
| Paramenthane hydroperoxide | 0.10 |
| Versene Iron Chelate | 0.02 |
| Sodium formaldehyde sulfoxylate | variable |
| Sodium benzaldehyde sulfoxylate | variable |

| Run | | | | | | | | |
|---|---|---|---|---|---|---|---|---|
| A | | B | | C | | D | | |
| Molal Percent SBS/SFS | | | | | | | | |
| 0/100 | | 25/75 | | 50/50 | | 75/25 | | |
| Hrs. | Per cent Conv. | Hrs. | Per cent Conv. | Hrs. | Per cent Conv. | Hrs. | Percent Conv. | |
| 1.22 | 5.25 | 1.25 | 15.35 | 1.28 | 17.73 | 1.33 | 8.35 | |
| 2.68 | 17.17 | 2.73 | 30.61 | 2.78 | 32.71 | 2.83 | 9.33 | |
| 4.17 | 29.10 | 4.22 | 44.90 | 4.27 | 45.50 | 4.32 | 9.28 | |
| 5.67 | 42.10 | 5.72 | 58.00 | 5.75 | 58.30 | 5.80 | 9.20 | |
| 24.37 | 94.40 | 24.42 | 94.9 | 24.45 | 86.50 | 24.50 | 10.09 | |

When plotted, these data show a family of curves. A, the all SFS recipe, has an induction period of ¾ hours, B and C start polymerizing instantly, rapidly attain a linear conversion rate and go to desired conversion level in reasonable time with B having the better performance. Run D with high SBS starts quickly but dies out early.

*Example IX*

Another series of runs was made in the manner of Example VII using butadiene and vinylidene chloride as the monomers and using molal replacement of SFS by SBS of 0%, 25%, 50%, and 75%.

| Ingredient | Parts by Weight |
|---|---|
| Butadiene | 50 |
| Vinylidene chloride | 50 |
| Water | 200 |
| Mixed 50/50 disproportionated rosin acid/fatty acid | 4.5 |
| Tamol N | 0.10 |
| Tertiary C$_{12}$ mercaptan | 0.20 |
| Potassium chloride | 0.60 |
| Paramenthane hydroperoxide | 0.10 |
| Versene Iron Chelate | 0.03 |
| Sodium formaldehyde sulfoxylate | variable |
| Sodium benzaldehyde sulfoxylate | variable |

| Run | | | | | | | | |
|---|---|---|---|---|---|---|---|---|
| A | | B | | C | | D | | |
| Molal Percent SBS/SFS | | | | | | | | |
| 0/100 | | 25/75 | | 50/50 | | 75/25 | | |
| Hrs. | Per cent Conv. | Hrs. | Per cent Conv. | Hrs. | Per cent Conv. | Hrs. | Percent Conv. | |
| 1.05 | 5.48 | 1.08 | 20.36 | 1.12 | 24.10 | 1.15 | 11.39 | |
| 2.50 | 21.37 | 2.55 | 42.70 | 2.58 | 45.60 | 2.62 | 11.12 | |
| 4.03 | 43.61 | 4.05 | 62.50 | 4.10 | 63.70 | 4.13 | 11.31 | |
| 5.52 | 61.50 | 5.55 | 73.40 | 5.58 | 73.40 | 5.65 | 11.98 | |

As in the previous cases the all SFS run A had an induction period (here 1 hour), the approx. 20% molal replacement of SFS by SBS (run B) gave the best overall conversion curve, the 50% replacement (run C) also gave a good curve, but run D wherein more than 50 molal percent replacement of SFS was made gave early die off after a rapid start.

It should be appreciated that variations in the basic recipe such as a slight variation in the amount of iron used, or emulsifier, or modified could cause the optimum percent replacement of SFS by SBS to shift slightly up or down from 20%.

The embodiments of the invention in which an exclusive property or privilege is claimed are defined as follows:

1. The low temperature polymerization of an aqueous emulsion system containing 100 parts of polymerizable synthetic rubber-forming monomers selected from the group consisting of conjugated butadiene-1,3 hydrocarbons and mixtures of said hydrocarbons with compounds which contain a single $CH_2=C<$ group and are copolymerizable with said hydrocarbons and containing 0.02 to 2.0 parts of an organic peroxide catalyst, from 1.0 to 10.0 parts of a mixed fatty acid/rosin acid emulsifier, and an activator selected from the group consisting of disodium ferrous ethylenediamine tetraacetate, monosodium ferric ethylenediamine tetraacetate, and combinations of inorganic ferrous and ferric salts with a sequestering agent selected from the group consisting of tetrasodium ethylenediamine tetraacetate, 90% tetrasodium ethylenediamine tetraacetate/10% dihydroxyethylglycine, and equimolar mixed trisodium hydroxyethylenediamine triacetate/sodium gluconate, said activator containing from 0.0002 to 0.008 part of sequestered iron, and, in addition, from 0.02 to 2.0 parts of a mixture consisting of 15 to 70 molal percent sodium benzaldehyde sulfoxylate and 85 to 30 molal percent sodium formaldehyde sulfoxylate.

2. The low temperature polymerization of an aqueous emulsion system containing 100 parts of polymerizable synthetic rubber-forming monomers selected from the group consisting of conjugated butadiene-1,3 hydrocarbons and mixtures of said hydrocarbons with compounds which contain a single $CH_2=C<$ group and are copolymerizable with said hydrocarbons and containing 0.02 to 2.0 parts of an organic peroxide catalyst, from 1.0 to 10.0 parts of a mixed disproportionated rosin acid/fatty acid emulsifier, and an activator selected from the group consisting of disodium ferrous ethylenediamine tetraacetate, monosodium ferric ethylenediamine tetraacetate, and combinations of inorganic ferrous and ferric salts with a sequestering agent selected from the group consisting of tetrasodium ethylenediamine tetraacetate, 90% tetrasodium ethylenediamine tetraacetate/10% dihydroxyethylglycine, and equimolar mixed trisodium hydroxyethylenediamine triacetate/sodium gluconate, said activator containing from 0.0002 to 0.008 part of sequestered iron, and, in addition, from 0.02 to 2.0 parts of a mixture consisting of 15 to 70 molal percent sodium benzaldehyde sulfoxylate and 85 to 30 molal percent sodium formaldehyde sulfoxylate.

3. The low temperature polymerization of an aqueous emulsion system containing 100 parts total of butadiene and styrene and containing 0.02 to 2.0 parts of an organic peroxide catalyst, from 1.0 to 10.0 parts of a mixed disproportionated rosin acid/fatty acid emulsifier, and an activator selected from the group consisting of disodium ferrous ethylenediamine tetraacetate, monosodium ferric ethylenediamine tetraacetate, and combinations of inorganic ferrous and ferric salts with a sequestering agent selected from the group consisting of tetrasodium ethylenediamine tetraacetate, 90% tetrasodium ethylenediamine tetraacetate/10% dihydroxyethylglycine, and equimolar mixed trisodium hydroxyethylenediamine triacetate/sodium gluconate, said activator containing from 0.0002 to 0.008 part of sequestered iron, and, in addition, from 0.02 to 2.0 parts of a mixture consisting of 15 to 70 molal percent sodium benzaldehyde sulfoxylate and 85 to 30 molal percent sodium formaldehyde sulfoxylate.

4. The low temperature polymerization of an aqueous emulsion system containing 100 parts of butadiene-1,3 and containing from 0.02 to 2.0 parts of an organic peroxide catalyst, from 1.0 to 10.0 parts of a mixed disproportionated rosin acid/fatty acid emulsifier, and an activator selected from the group consisting of disodium ferrous ethylenediamine tetraacetate, monosodium ferric ethylenediamine tetraacetate, and combinations of inorganic ferrous and ferric salts with a sequestering agent selected from the group consisting of tetrasodium ethylenediamine tetraacetate, 90% tetrasodium ethylenediamine tetraacetate/10% dihydroxyethylglycine, and equimolar mixed trisodium hydroxyethylenediamine triacetate/sodium gluconate, said activator containing from 0.0002 to 0.008 part of sequestered iron, and, in addition, from 0.02 to 2.0 parts of a mixture consisting of 15 to 50 molal percent sodium benzaldehyde sulfoxylate and 85 to 50 molal percent sodium formaldehyde sulfoxylate.

5. The low temperature polymerization of an aqueous emulsion system containing 100 parts total of butadiene-1,3 and vinylidene chloride and containing 0.02 to 2.0 parts of an organic peroxide catalyst, from 1.0 to 10.0 parts of a mixed disproportionated rosin acid/fatty acid emulsifier, and an activator selected from the group consisting of disodium ferrous ethylenediamine tetraacetate, monosodium ferric ethylenediamine tetraacetate, and combinations of inorganic ferrous and ferric salts with a sequestering agent selected from the group consisting of tetrasodium ethylenediamine tetraacetate, 90% tetrasodium ethylenediamine tetraacetate/10% dihydroxyethylglycine, and equimolar mixed trisodium hydroxyethylenediamine triacetate/sodium gluconate, said activator containing from 0.0002 to 0.008 part of sequestered iron, and, in addition, from 0.02 to 2.0 parts of a mixture consisting of 15 to 50 molal percent sodium benzaldehyde sulfoxylate and 85 to 50 molal percent sodium formaldehyde sulfoxylate.

References Cited in the file of this patent
UNITED STATES PATENTS
2,716,107  Brown ---------------- Aug. 23, 1955